US009964997B2

(12) United States Patent
Gueorguiev et al.

(10) Patent No.: US 9,964,997 B2
(45) Date of Patent: May 8, 2018

(54) LOCKING BAR FOR A COMPUTER

(71) Applicant: HEWLETT-PACKARD DEVELOPMENT COMPANY, L.P., Houston, TX (US)

(72) Inventors: George Hristov Gueorguiev, Fort Collins, CO (US); Jonathan Shea Robinson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 14/907,944

(22) PCT Filed: Sep. 25, 2013

(86) PCT No.: PCT/US2013/061653
§ 371 (c)(1),
(2) Date: Jan. 27, 2016

(87) PCT Pub. No.: WO2015/047245
PCT Pub. Date: Apr. 2, 2015

(65) Prior Publication Data
US 2016/0252935 A1 Sep. 1, 2016

(51) Int. Cl.
*G06F 1/16* (2006.01)

(52) U.S. Cl.
CPC .......... *G06F 1/1679* (2013.01); *G06F 1/1616* (2013.01)

(58) Field of Classification Search
None
See application file for complete search history.

(56) References Cited

U.S. PATENT DOCUMENTS

| 5,375,076 | A * | 12/1994 | Goodrich | G06F 1/1626 361/679.17 |
| 6,002,581 | A * | 12/1999 | Lindsey | G06F 1/1616 312/223.2 |
| 7,299,580 | B2 * | 11/2007 | Wang | F16M 11/10 248/461 |
| 7,301,590 | B2 | 11/2007 | Lee | |
| 8,162,283 | B1 * | 4/2012 | Royz | F16M 11/10 248/455 |
| 2004/0145871 | A1 * | 7/2004 | Lee | H05K 5/0204 361/732 |

(Continued)

FOREIGN PATENT DOCUMENTS

| CN | 2556692 | 6/2003 |
| EP | 0600410 | 6/1994 |

(Continued)

OTHER PUBLICATIONS

Detwiler, B.; "Kindle Fire HD Teardown Reveals Repair-ready Tablet with Minor Annoyances"; Cracking Open; Sep. 20, 2012; 9 pages.

(Continued)

*Primary Examiner* — Courtney Smith
*Assistant Examiner* — Rashen E Morrison
(74) *Attorney, Agent, or Firm* — HP Inc Patent Department (57) ABSTRACT

A locking system is disclosed. The locking system comprises a locking bar rotatable between a locked position and an unlocked position. A locking feature on the locking bar engages a tab when the locking bar is rotated into the locked position.

15 Claims, 8 Drawing Sheets

(56) References Cited

U.S. PATENT DOCUMENTS

| | | | |
|---|---|---|---|
| 2005/0052831 A1* | 3/2005 | Chen | G06F 1/1616 361/679.11 |
| 2006/0028791 A1* | 2/2006 | Huang | G06F 1/1601 361/679.08 |
| 2006/0109617 A1* | 5/2006 | Chen | G06F 1/1626 361/679.55 |
| 2007/0232109 A1 | 10/2007 | Parker et al. | |
| 2008/0218655 A1 | 9/2008 | Won et al. | |
| 2010/0142130 A1* | 6/2010 | Wang | H04M 1/04 361/679.01 |
| 2011/0164370 A1* | 7/2011 | McClure | G06F 1/1613 361/679.26 |
| 2011/0285258 A1* | 11/2011 | Yuan | G06F 1/1626 312/223.2 |
| 2012/0000908 A1 | 1/2012 | So | |
| 2012/0044123 A1* | 2/2012 | Rothkopf | H01Q 1/243 343/878 |
| 2012/0106047 A1* | 5/2012 | Chu | G06F 1/166 361/679.01 |
| 2012/0242592 A1 | 9/2012 | Rothkopf et al. | |
| 2013/0107427 A1* | 5/2013 | Cheng | G06F 1/1626 361/679.01 |
| 2013/0109253 A1 | 5/2013 | Gammon et al. | |
| 2013/0176681 A1* | 7/2013 | Lee | G06F 1/1626 361/679.55 |
| 2014/0084762 A1* | 3/2014 | Lai | H05K 5/0221 312/223.1 |

FOREIGN PATENT DOCUMENTS

| | | |
|---|---|---|
| JP | 08-032254 | 2/1996 |
| KR | 10-2002-0068184 | 8/2002 |

OTHER PUBLICATIONS

Detwiler; B.; "Samsung Galaxy Note 10.1 Teardown Shows Rigid, Repair-friendly Design" Cracking Open; Aug. 31, 2012; 8 pages.

Gavin Gear; "HP Z1 All-in-One: Compact Workstation"; Aug. 30, 2012; 4 pages.

http://shop.lenovo.com/us/en/landing_pages/thinkcentre/2010/m90z; "Introducing Thinkcentre M90Z"; 3 pages.

* cited by examiner

LOCKING BAR FOR A COMPUTER

BACKGROUND

Touch screens are gaining in popularity. Many different types of computers are now shipping with touch screens, for example tablets, laptops and convertibles. A convertible is a tablet and a keyboard that can be joined together and used as a laptop, or pulled apart and used as a tablet. Touch screens allow a user to interact with the computer by dragging one or more of their fingers across the screen to complete an action. This allows a much more intuitive user interface (UI). For example a user can zoom in on an object by spreading two fingers apart over the object. Users typically interact with an outer layer of glass on most touch screens. The glass is generally mounted flush with the computer case which allows for the maximum touch screen area.

DETAILED DESCRIPTION

Mounting the glass in a touch screen display flush with the computer case can be done in a number of ways. One method uses adhesive around the bottom edges of the display to bond the display to the computer case. Unfortunately, gluing the display to the computer case makes it difficult to service the components in the computer case. With the display glued to the computer case, the user replaceable battery must be accessed from the bottom of the computer case. This puts additional design constraints on the internal structure of the computer case. Other screw based attachment methods have similar types of problems, they are too hard to open by a user and require access through the bottom of the computer case for user swappable components. In addition the visibility of the screws may be an issue once the product has been assembled.

In one example a display can be removably mounted into a computer case using a rotating locking bar on one side of the computer case. The locking bar has at least one locking feature that holds/locks one edge of the display into the computer case when rotated into a locked position. The other edge of the display is coupled to the case, for example with a lip that slides under the edge of the case. When the locking bar is rotated to an unlocked position the locked edge of the display is released from the case. This allows the display to be rotated along the opposite edge of the display from a closed position into an opened position, allowing access into the computer case. In one example the locked edge of the display is moved away from the computer case when the locking bar is rotated from the locked position to the unlocked position. This makes it easier for a user to access the edge of the display and rotate the display from the closed position into the open position.

Figure 1A:
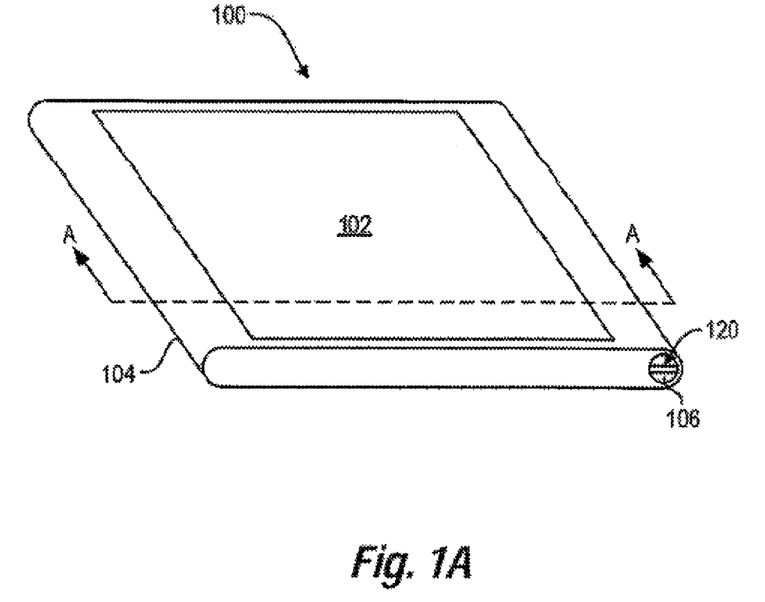
FIG. 1 is an isometric view of an example tablet 100.

FIG. 1A is an isometric view of an example tablet 100. Tablet 100 comprises a case 104, a touch screen display 102 and a locking bar 106. The touch screen display 102 is mounted in the top side of case 104 with the to surface of the display flush with the top surface of case 104. The locking bar 106 is mounted on the right side of case 104 and is shown in the locked position, locking display 102 into case 104. In this example locking bar 106 has a slot 120 formed at one end of the locking bar 106 such that the locking bar 106 can be rotated using a screwdriver. In other examples a ridge or knob may be used to enable the user to rotate the locking bar 106 without using a tool.

Figure 1B:
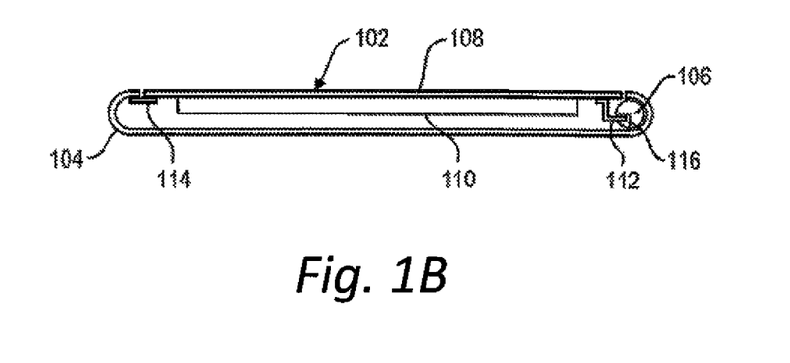
FIG. 1B is a sectional side view of tablet 100 as shown by arrows AA in FIG. 1A.

FIG. 1B is a sectional side view of tablet 100 as shown by arrows AA in FIG. 1A. Case 104 has a floor and four side walls that form an enclosure. Display 102 is mounted in case 104 in the top of the enclosure. Display 102 comprises a block of transparent material 108, display electronics 110, a thin plate 114 and two locking tabs 112 (only one tab is visible in this view). Other components will be mounted inside the enclosure formed by case 104, for example computer electronics, a hard drive, a battery and the like, but these components are not shown for clarity.

The block of transparent material 108 is typically fabricated from glass, but could be fabricated from transparent plastic. Display electronics 110 are attached to the bottom center section of the block of transparent material 108. Display electronics project images up through the block of transparent material 108 for the user to interact with.

Two tabs 112 are attached to the bottom right side of the block of transparent material 108. The tabs 112 engage with two locking features 116 in locking bar 106 (only one locking feature is visible in this view) and hold the display down into case 104. In this example the locking features are 90 degree cutouts formed into locking bar 106. The cutouts 116 capture the ends of the two locking tabs 112 when the locking bar is rotated into the locked position (as shown). In this example locking bar is a long cylinder that can be rotated along the cylindrical axis between a locked position (as shown) and an unlocked position (see FIG. 5).

A thin plate is attached to the left bottom edge of the block of transparent material 108 forming a lip that fits underneath the left side of case 104. The lip allows the display to be rotated along the left edge of the display from a closed position (as shown in FIG. 1A) to an open position (as shown in FIG. 1C) when the locking bar 106 is in the unlocked position.

Figure 1C:
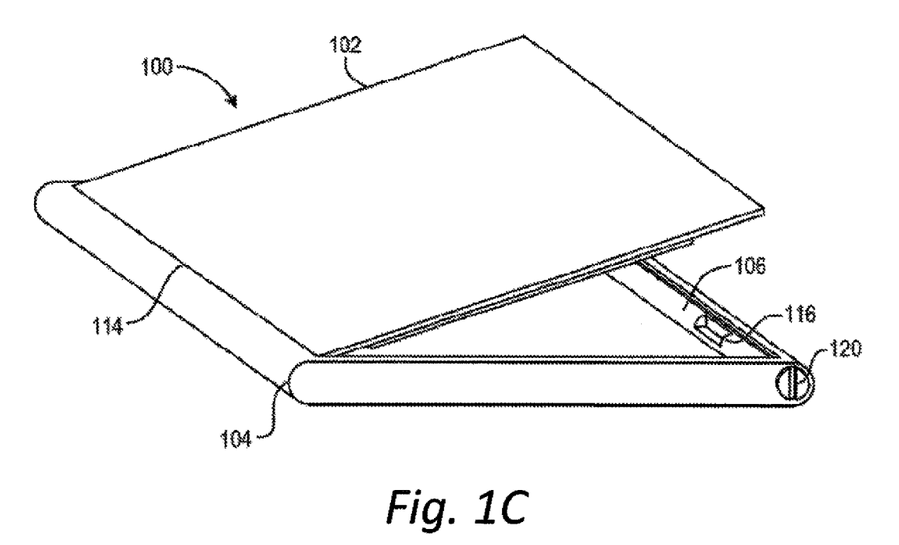
FIG. 1C is an isometric view of example tablet 100.

FIG. 1C is an isometric view of example tablet 100. Tablet 100 is shown with locking bar 106 rotated into the unlocked position with locking features 116 open upwards (only one locking feature is visible). Display 102 is shown rotated about the left edge 114 of display in a partially opened position. Once the display 102 is in the open position it can be completely removed/detached from case 104. In some examples a cable between the display 102 and the computer electronics may need to be disconnected before the display 102 can be completely removed from case 104. In other examples the display 102 may be attached to the case with a hinge along the left edge and may not be removable from case 102.

Figure 2:
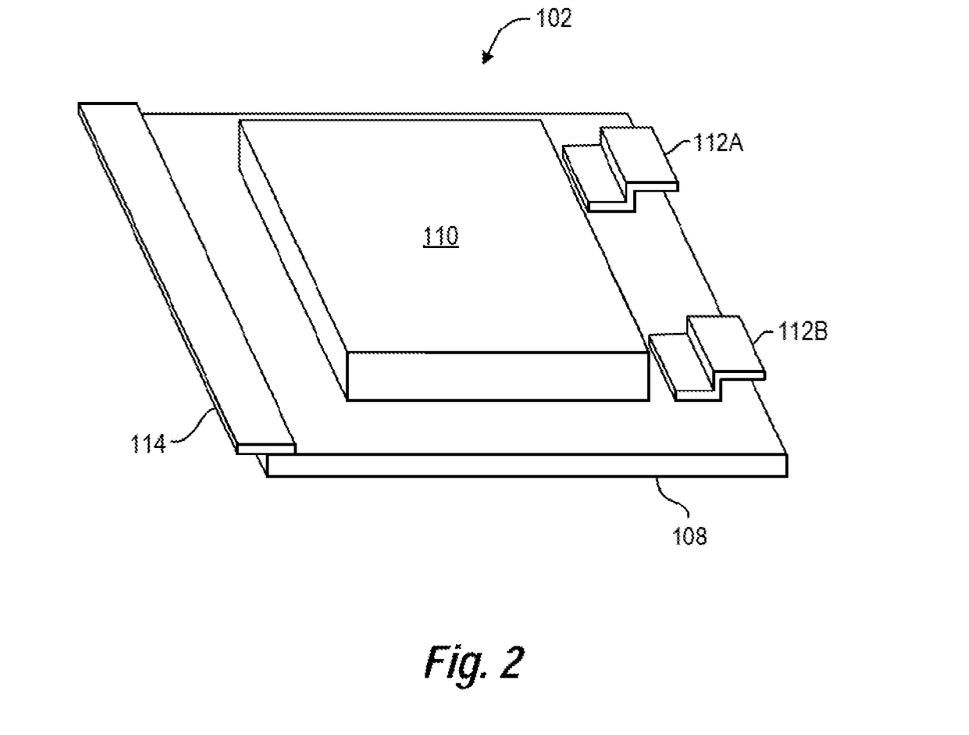
FIG. 2 is an isometric bottom view of display 102.

FIG. 2 is an isometric bottom view of display 102. Display 104 comprises a block of transparent material 108, display electronics 110, a thin plate 114 and two locking tabs 112. Display electronics 110 are attached to the center section of the block of transparent material 108. Two tabs 112A and 112B are attached to the right side of the block of transparent material 108. The thin plate is attached to the left edge of the block of transparent material 108 forming a lip that fits underneath the left side of case 104. In other examples the lip may be formed as part of the left edge of case 104.

Figure 3:
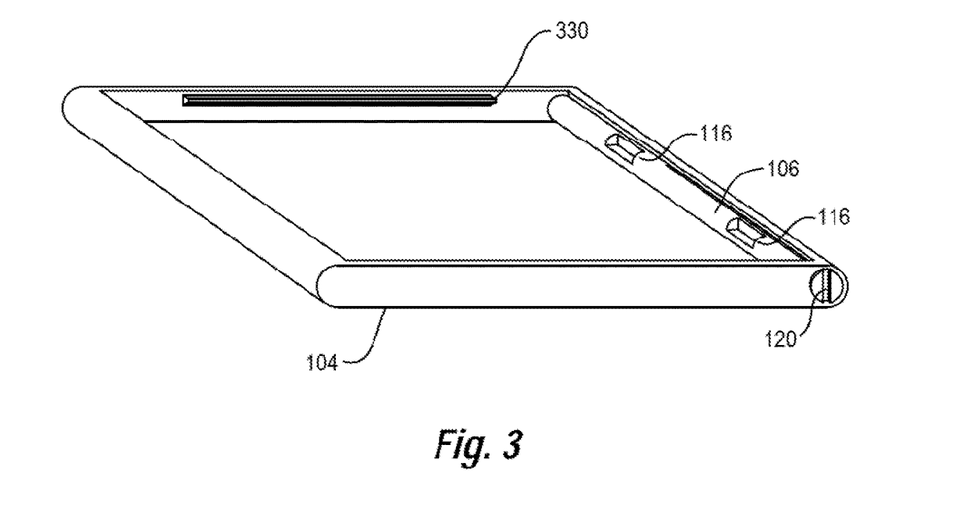
FIG. 3 is an isometric top view of case 104 with locking bar 106 installed in the right side of case 104.

FIG. 3 is an isometric top view of case 104 with locking bar 106 installed in the right side of case 104. Locking bar 106 is shown in the unlocked position with the two locking features 116 spaced apart along the length of locking bar 106. In other examples there may be more of fewer locking features 116 along the length of locking bar 106. Case 104 has two support rails 330 formed on the inside of the top and bottom side walls of case 104 (only the top support rail 330 is visible). The two support rails prevent the display from falling into the enclosure and support display 102 as the lip 114 mounted to display 102 is being coupled to the left side of case 104.

Figure 4:
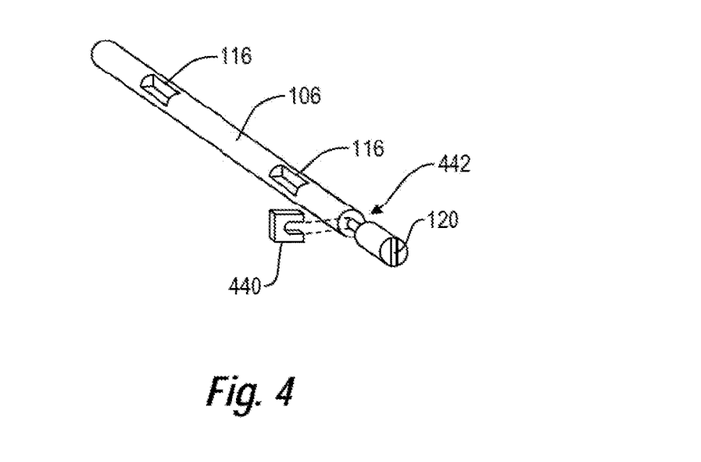
FIG. 4 is an isometric view of an example locking bar 106.

In this example locking bar 106 is a long cylindrical column that can be rotated between a locked position and an unlocked position. Locking bar may be mounted in case 104 by inserting locking bar 106 into a cylindrical hole formed in case 104. FIG. 4 is an isometric view of an example locking bar 106. In this example, locking bar may be held into case 104 using a collar 440 that fits into a groove 442 formed in locking bar 106. The collar couples to a slot formed in case 104. Once the locking bar 106 has been inserted into the cylindrical hole formed in case 104 the collar can be slid into groove 442 and mated with the slot formed in case 104. The collar holds locking bar 106 in place but allows locking bar 106 to be rotated about the cylindrical axis of locking bar 106. In some examples features on locking bar may limit the rotation of locking bar 106 to less than 360 degrees, for example to between 90 degrees and 120 degrees.

Figure 5A:
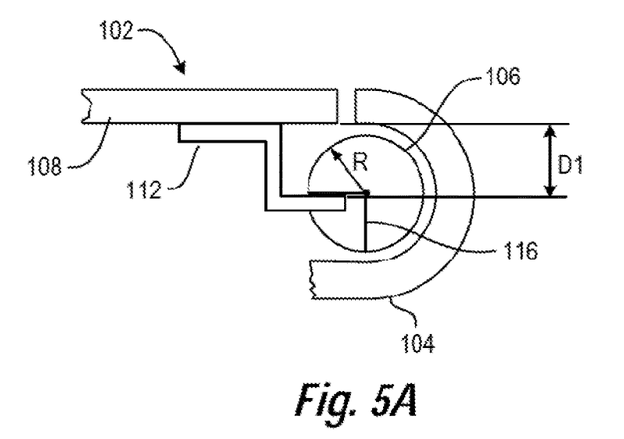
FIGS. 5A, 5B, 5C are expanded sectional side views of the example tablet of FIG. 1B.
Figure 5B:
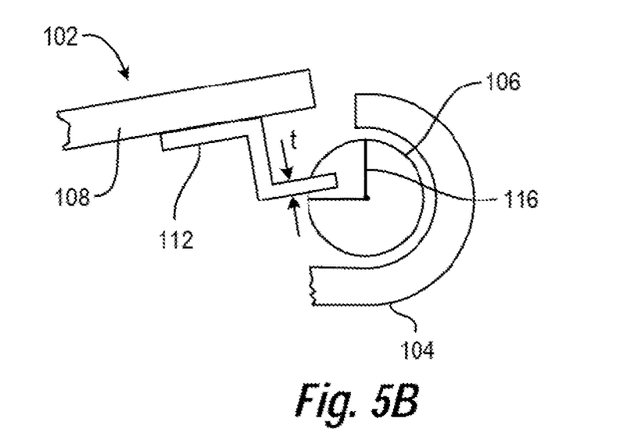
Figure 5C:
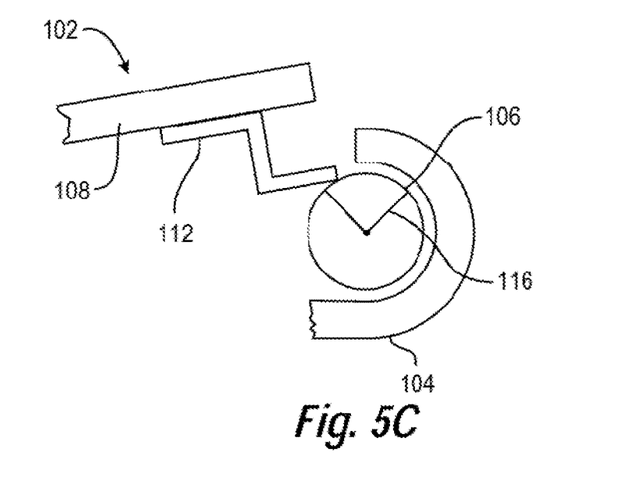

FIG. 5A-5C are expanded sectional side views of the example tablet of FIG. 1B. FIG. 5A shows the display in the closed position with locking bar 106 in the locked position. Locking bar 106 has a radius R. Tab 112 is engaged with locking feature 116 which holds the display 102 into case 104. Tab 112 extends down below the bottom surface of the transparent material 108 by distance D1. In some examples D1 is substantially the same as, or slightly longer than, R. This allows the top surface of the locking feature 116 to be parallel with the top surface of the tab 112 when the locking bar is in the locked position (i.e. when the two surfaces are engaged).

FIG. 5B shows the locking bar 106 in the unlocked position. In this example the unlocked position is rotated 90 degrees (clockwise in FIG. 5B) from the locked position. When the locking bar 106 is in the unlocked position, the display 102 has been translated upwards by the thickness t of tab 112. The tab 112 is no longer captured by locking feature 112 and the display is free to be moved upwards. FIG. 5C shows the locking bar 106 rotated (clockwise in FIG. 5C) beyond the unlocked position. As locking bar 106 rotates beyond 90 degrees from the locked position the bottom side of locking feature 116 pushes tab 112 upwards. As tab 112 is pushed upwards, the right edge of display 102 is pushed above the right edge of case 104 allowing, the user to grab the edge and rotate the display to the open position (see FIG. 1C).

Figure 6A:
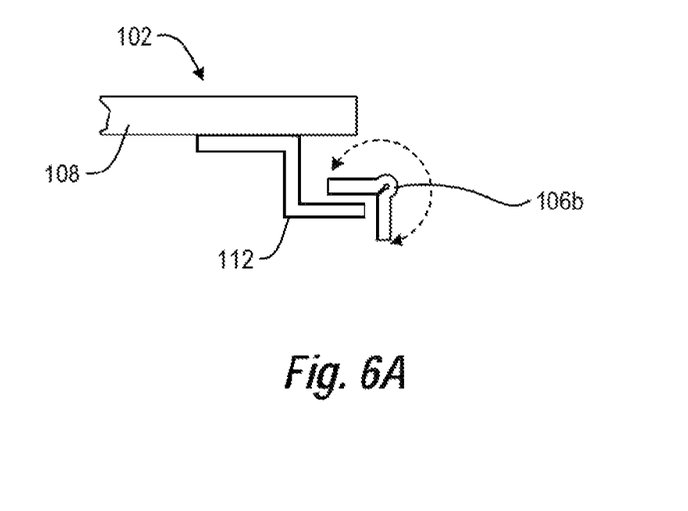
FIG. 6A is another example of a locking bar 106B.

FIG. 6A is another example of a locking bar 106B. Locking bar 106B has a locking feature formed from two beams perpendicular to each other joined together along the ends of each beam. The beams rotate about the point where the ends are joined together. Locking has 106B is shown in the locked position with one of the beams engaged with the tab 112 attached to the transparent block of material 108. When the locking bar 106 is rotated to the unlocked position and beyond, the lower beam will push tab 112 upwards, thereby raising the edge of display 102 above the right edge of case 104 (not shown).

Figure 6B:
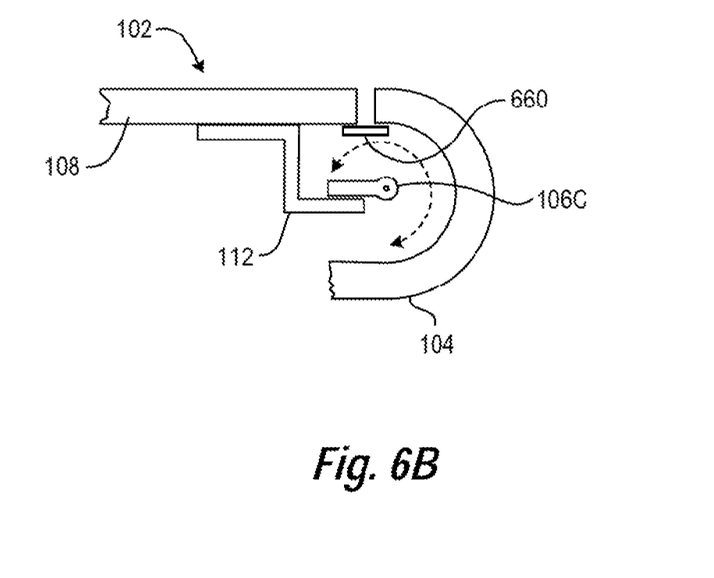
FIG. 6B is another example of a locking bar 106C.

FIG. 6B is another example of a locking bar 106C. Locking bar 106C has a locking feature formed from a single beam. The beam rotates around on end. Locking bar 106C is shown in the locked position with the beam engaged with the tab 112 attached to the transparent block of material 108. When the locking bar 106 is rotated to the unlocked position and beyond the edge of display 102 remains resting on lip 660 and will need to be manually raised away from case 104.

Figure 7A:
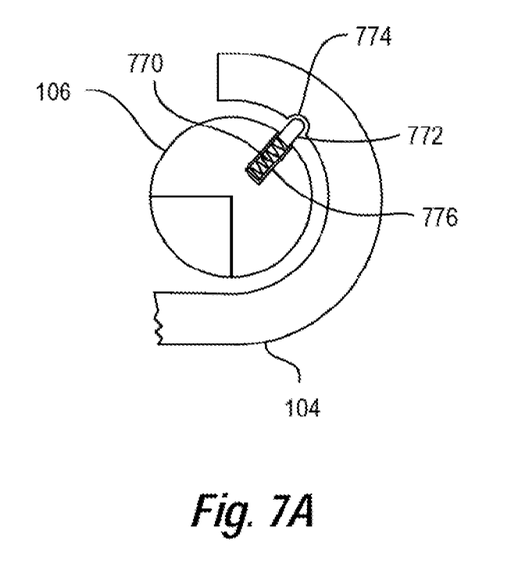
FIG. 7A is a cutaway side view of an example locking bar 106 mounted in case 104 in the locked position.

In some examples the locking bar will be held in the locked position. FIG. 7A is a cutaway side view of an example locking bar 106 mounted in case 104 in the locked position. Locking bar 106 has a spring 770 loaded plug 772 loaded in a hole formed in locking bar 106. A detent 774 is formed in the wall of case 104. When the locking bar 106 is in the locked position, the spring loaded plug snaps into detent 774 holding locking bar in the locked position. Rotating the locking bar forces the plug back into the hole allowing the locking bar to be rotated into the unlocked position.

Figure 7B:
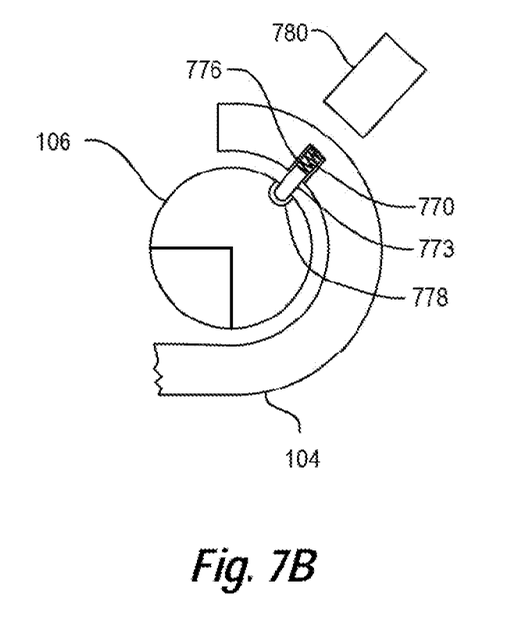
FIG. 7B is a cutaway side view of another example locking bar 106 mounted in case 104 in the locked position.

In some examples the locking bar can be used as a security feature by preventing unauthorized users from accessing the components inside case 104. The security feature will prevent the locking bar from rotating until the security feature is disengaged. FIG. 7B is a cutaway side view of another example locking bar 106 mounted in case 104 in the locked position. Locking bar 106 is shown in the locked position. A hole is formed in locking bar 106. A spring 770 loaded pin 773 is mounted in a hole formed in case 104. Pin 773 is made from a magnetic material, for example steel. To disengage the security feature and rotate the locking bar into the unlocked position, a magnet 780 is held against case 104 near where pin 773 is located. The magnet will pull pin 773 out of the hole formed in locking bar 106, allowing the locking bar 106 to be rotated into the unlocked position.

In other examples the locking bar may have a lock integrated into looking bar 106. A key would be inserted into the lock to disengage the lock and allow the locking bar to be rotated. In yet another example an electromechanical device, for example a solenoid, may be used to inset a locking pin into the locking bar. The solenoid can be energized by typing in a password into tablet 100. Once the solenoid is energized the locking pin will be removed from locking bar 106 allowing the locking bar to be rotated into the unlocked position.

The rotating locking bar in the above examples has been described as holding a touch screen display into the case of a tablet. The locking bar describe above is not limited to a touch screen display or a tablet, other display types can also be held into a computer case. In fact any two computer components may be held together using the locking bar described above. The locking bar may also be used to hold a laptop or convertible computer closed.

Figure 8:
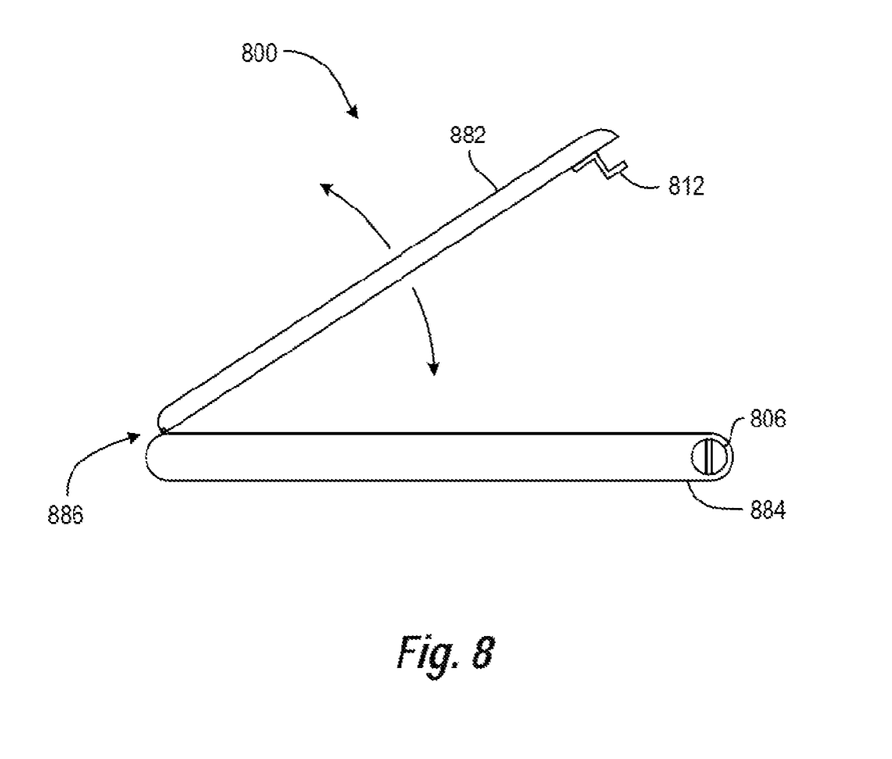
FIG. 8 is a side view of an example laptop computer 800.

FIG. 8 is a side view of an example laptop computer 800. Laptop computers are also known as portable computers. Laptop computer 800 has two components; a display component and a keyboard component 884. The display component 882 is attached to the keyboard component 884 along one edge with a hinge 886. Hinge 886 allows the display component 882 to be rotated from an open position to a closed position. Display component 882 is shown in a partially opened position. In the closed position display component 882 will be parallel with, and adjacent to, the keyboard component 884. Keyboard component 884 has a locking bar installed along the right side (front edge) of the keyboard component. Display component 882 has one or more tabs 812 attached to the right bottom side of the display component 882. When the display component is rotated into the closed position and the locking bar 884 is rotated into the locked position, locking features spaced along the locking bar 806 will engage with tab 812 thereby holding the display component 882 closed.

What is claimed is:

1. A locking system for a computer, comprising:
   a locking bar mounted in a first side of a first component of the computer, wherein:
      the locking bar is rotatable between a locked position and an unlocked position; and
      the first component has a second side opposite the first side;
   a locking feature located along a length of the locking bar;
   a second component of the computer having a first edge and a second edge opposite the first edge, wherein the first edge of the second component is rotationally coupled to the second edge of the first component to allow rotation of the second component between an open position and a closed position along the first edge of the second component; and
   a tab attached to a bottom side of the second edge of the second component, the tab to:
      mate with the locking feature when the second component is in the closed position and the locking bar is rotated into the locked position; and
      responsive to contact from a bottom side of the locking feature, translate in a vertical direction with respect to the locking feature when the second component is in the open position and the locking bar is rotated beyond 90 degrees from the locked position into the unlocked position.

2. The locking system for a computer of claim 1, wherein the locking bar is a cylinder rotatable around the cylindrical axis and the locking feature is a 90 degree cutout formed in the locking bar.

3. The locking system for a computer of claim 1, wherein the second component is a display and the first component is a case for a tablet.

4. The locking system for a computer of claim 1, wherein the computer is a laptop and the second component is a display component and the first component is a keyboard component.

5. The locking system for a computer of claim 1, further comprising:
   a security device attached to the locking bar that prevents the locking bar from rotating from the locked position into the unlocked position until the security feature is disengaged.

6. The locking system for a computer of claim 5, wherein the security feature is an electromechanical device that is disengaged when a password is entered into the computer.

7. The locking system for a computer of claim 5, wherein the first edge of the second component is removably coupled to the second edge of the first component allowing the second component to be removed from the first component.

8. A computer, comprising:
   a case having a floor and four side walls, wherein:
      the four side walls and the floor form an enclosure; and
      a first one of the four side walls is opposite a second one of the four side walls;
   a locking bar located inside the enclosure at the first side wall, wherein the locking bar is rotatable between a locked position and an unlocked position;
   a locking feature located along a length of the locking bar;
   a display having a first edge and a second edge opposite the first edge, wherein the first edge is coupled to the second side wall such that the display is rotatable between an open position and a closed position; and
   a tab attached to the bottom side of the second edge of the display, the tab to:
      mate with the locking feature when the display is in the closed position and the locking bar is rotated into the locked position; and
      responsive to contact from a bottom side of the locking feature, translate in a vertical direction with respect to the locking feature when the second component is in the open position and the locking bar is rotated beyond 90 degrees from the locked position into the unlocked position.

9. The computer of claim 8, wherein the first edge of the display is coupled to the second side wall with a lip attached to a bottom side of the first edge of the display, the lip allowing the display to be rotated along the first edge between an open position and a closed position when the lip is engaged with the second side wall.

10. The computer of claim 8, wherein the locking bar is a cylinder rotatable around the cylindrical axis and the locking feature is a 90 degree cutout formed in the locking bar.

11. The computer of claim 8, further comprising:
    a first support rail formed on an inside face of a third one of the four side walls and a second support rail formed on an inside face of a forth one of the four side walls where the third side wall is opposite the fourth side wall.

12. The computer of claim 8, further comprising:
    a spring loaded plug mounted in the locking bar that mates with a detent in the case when the locking bar is at the closed position.

13. The computer of claim 8, wherein the locking bar moves the second edge of the display above the case when the locking bar is rotated to the unlocked position.

14. The computer of claim 8, wherein the computer is a tablet and the display is a touch screen display.

15. A method of manufacturing a computer, comprising:
    providing a case comprising a floor and four side walls wherein:
       the four side walls and the floor form an enclosure; and
       a first one of the four side walls is opposite a second one of the four side walls;
    installing a locking bar into the enclosure at a first side wall, wherein:
       the locking bar is rotatable between a locked position and an unlocked position; and
       the locking bar has a locking feature located along a length of the locking bar;
    installing a display having a first edge and a second edge opposite the first edge into the case wherein:
       the first edge is coupled to a left side of the wall of the case;
       the second edge has a tab attached to a bottom of thereof; and the display is rotatable between an open position and a closed position;

rotating the display into the closed position such that the tab mates with the locking feature;

rotating the locking bar into the locked position to lock the display to the case;

rotating the locking bar beyond 90 degrees from the locked position into the unlocked position, wherein rotating the locking bar into the unlocked position causes the bottom side of the locking feature to contact the tab and translate the tab vertically with respect to the locking feature; and rotating the display into the open position, wherein the display is translated vertically by a thickness of the tab.

* * * * *